US009367533B2

(12) United States Patent
Howell et al.

(10) Patent No.: US 9,367,533 B2
(45) Date of Patent: Jun. 14, 2016

(54) METHOD AND SYSTEM FOR GENERATING AND UTILIZING PERSISTENT ELECTRONIC TICK MARKS

(71) Applicant: WORKIVA INC., Ames, IA (US)

(72) Inventors: Joseph Howell, Portland, OR (US);
Jerome M. Behar, Los Altos, CA (US);
Anna Kwok, Union City, CA (US)

(73) Assignee: Workiva Inc., Ames, IA (US)

(*) Notice: Subject to any disclaimer, the term of this patent is extended or adjusted under 35 U.S.C. 154(b) by 557 days.

(21) Appl. No.: 13/748,971

(22) Filed: Jan. 24, 2013

(65) Prior Publication Data

US 2013/0139047 A1    May 30, 2013

Related U.S. Application Data

(63) Continuation of application No. 12/614,217, filed on Nov. 6, 2009, now Pat. No. 8,375,291.

(60) Provisional application No. 61/112,402, filed on Nov. 7, 2008.

(51) Int. Cl.
*G06F 17/00* (2006.01)
*G06F 17/24* (2006.01)

(52) U.S. Cl.
CPC .................... *G06F 17/241* (2013.01)

(58) Field of Classification Search
CPC .................................................. G06F 17/241
USPC .................................................. 715/230–233
See application file for complete search history.

(56) References Cited

U.S. PATENT DOCUMENTS

| | | | |
|---|---|---|---|
| 5,692,073 A * | 11/1997 | Cass | G06F 17/243 358/468 |
| 6,047,259 A * | 4/2000 | Campbell et al. | 705/3 |
| 6,665,798 B1 | 12/2003 | McNally et al. | |
| 6,948,154 B1 | 9/2005 | Rothermel et al. | |
| 6,966,061 B1 | 11/2005 | Vance et al. | |
| 7,100,110 B2 | 8/2006 | Shiraishi et al. | |
| 7,376,621 B1 | 5/2008 | Ling | |
| 7,415,482 B2 | 8/2008 | Blake et al. | |
| 7,415,667 B2 | 8/2008 | Rhodes | |
| 7,644,375 B1 | 1/2010 | Anderson et al. | |
| RE41,450 E * | 7/2010 | Briggs | G06Q 30/02 707/999.003 |

(Continued)

OTHER PUBLICATIONS

Chao et al., PDF Document Layout Study with Page Elements and Bounding Boxes, Google 2000, pp. 1-3.*

(Continued)

*Primary Examiner* — Cong-Lac Huynh
(74) *Attorney, Agent, or Firm* — Drinker Biddle & Reath LLP

(57) ABSTRACT

Consistent with embodiments of the invention, computer-based systems and methods for annotating documents with a special type of graphical icon—referred to herein as a tick mark—are provided. Accordingly, utilizing a document annotation tool consistent with one embodiment of the invention, a user can quickly and easily place a tick mark next to an element of a document (e.g., a word, sentence, paragraph, number, chart, graph or figure) being displayed to visually convey some information about that particular element of the document. A second user, who is viewing the same document subsequent to the first user placing the tick mark, will immediately recognize and appreciate the information conveyed by the placement of the tick mark.

21 Claims, 10 Drawing Sheets

(56) References Cited

U.S. PATENT DOCUMENTS

| | | | |
|---|---|---|---|
| 7,769,646 B2 | 8/2010 | Wyle | |
| 7,912,857 B2 * | 3/2011 | Fujikawa | G06F 17/30011 707/782 |
| 7,921,355 B2 * | 4/2011 | Young | G06F 9/4443 707/722 |
| 7,966,561 B1 * | 6/2011 | Nguyen et al. | 715/277 |
| 8,032,837 B2 | 10/2011 | Bowman et al. | |
| 8,086,758 B1 * | 12/2011 | Allan et al. | 709/253 |
| 8,533,586 B1 | 9/2013 | Meyer et al. | |
| 8,739,025 B2 | 5/2014 | Haila et al. | |
| 8,788,412 B1 | 7/2014 | Hamm | |
| 8,792,730 B2 * | 7/2014 | Barrus | G06K 9/00463 382/224 |
| 8,793,575 B1 * | 7/2014 | Lattyak | G09B 5/062 715/273 |
| 8,813,178 B1 | 8/2014 | Khanna | |
| 8,839,092 B2 | 9/2014 | Albornoz et al. | |
| 2002/0082994 A1 | 6/2002 | Herziger | |
| 2002/0141643 A1 | 10/2002 | Jaeger | |
| 2002/0165875 A1 | 11/2002 | Verta | |
| 2004/0024842 A1 | 2/2004 | Witt | |
| 2004/0172594 A1 | 9/2004 | Jones et al. | |
| 2005/0114305 A1 * | 5/2005 | Haynes et al. | 707/3 |
| 2006/0053364 A1 | 3/2006 | Hollander et al. | |
| 2006/0230056 A1 | 10/2006 | Aaltonen | |
| 2007/0006301 A1 * | 1/2007 | Nickell et al. | 726/22 |
| 2007/0099168 A1 | 5/2007 | Nielsen | |
| 2007/0130502 A1 | 6/2007 | Tolgu et al. | |
| 2008/0028023 A1 * | 1/2008 | Locke | H04L 65/4015 709/203 |
| 2008/0120505 A1 | 5/2008 | Mizuno | |
| 2008/0133572 A1 | 6/2008 | Verhey-Henke et al. | |
| 2008/0183664 A1 * | 7/2008 | Cancel et al. | 707/2 |
| 2008/0189408 A1 * | 8/2008 | Cancel et al. | 709/224 |
| 2008/0201315 A1 | 8/2008 | Lazier et al. | |
| 2008/0209416 A1 | 8/2008 | De Souza et al. | |
| 2008/0307347 A1 * | 12/2008 | Cisler | G06F 11/1458 715/771 |
| 2009/0063567 A1 * | 3/2009 | Matsunaga | 707/104.1 |
| 2009/0235253 A1 | 9/2009 | Hope | |
| 2010/0097072 A1 | 4/2010 | Lakshmanan et al. | |
| 2010/0122154 A1 | 5/2010 | Howell et al. | |
| 2010/0145742 A1 | 6/2010 | Carey et al. | |
| 2010/0161499 A1 * | 6/2010 | Holcombe | G06Q 10/10 705/310 |
| 2010/0211562 A1 | 8/2010 | Busch et al. | |
| 2010/0235838 A1 | 9/2010 | Ibrahim et al. | |
| 2010/0241950 A1 | 9/2010 | Meuinier | |
| 2010/0318891 A1 | 12/2010 | Lo et al. | |
| 2011/0154338 A1 | 6/2011 | Ramanathaiah et al. | |
| 2011/0239102 A1 | 9/2011 | Tanaka et al. | |
| 2012/0011118 A1 | 1/2012 | Gleicher et al. | |
| 2014/0006921 A1 | 1/2014 | Gopinath et al. | |
| 2014/0019187 A1 | 1/2014 | Olsen et al. | |
| 2014/0164267 A1 | 6/2014 | Bianchini | |
| 2015/0100872 A1 | 4/2015 | Beezer et al. | |
| 2015/0212996 A1 | 7/2015 | Plante et al. | |
| 2015/0220638 A1 | 8/2015 | Motoyama et al. | |

OTHER PUBLICATIONS

Witten et al., Importing Documents and Metadata into Digital Libraries: Requirements Analysis and an Extensive Architecture, Springer 2002, pp. 390-405.*

Pravia et al., Lessons Learned in the Creation of a Data Set for Hard/Soft Information Fusion, IEEE 2009, pp. 2114-2122.*

U.S. Appl. No. 12/614,217, Response filed Aug. 27, 2012 to Non Final Office Action mailed May 25, 2012, 11 pgs.

U.S. Appl. No. 12/614,217, Non Final Office Action mailed May 25, 2012, 10 pgs.

U.S. Appl. No. 12/614,217, Notice of Allowance mailed Oct. 10, 2012, 6 pgs.

Cho, Chung-Suk, et al., "Building Project Scope Definition Using Project Definition Rating Index", Journal of Architectural Engineering, (Dec. 2001), 115-125.

Copanion, "Creating Tick Marks with Adobe Acrobat on Scanned Tax Document PDF Files", Google, (2007), 1-6.

Marshall, Catherine C, "The Haunting Question of Intelligibility", Retrieved from Google.com Search Engine, (2001), 8 pgs.

Pendergast, Mark O., "Three Short Cases for use in Online Introduction to COmputer Information Systems Courses", SIGITE Newsletter 5(1), (Jan. 2008), 10 pgs.

Slater, John A, "The TickIT Certification Scheme", IEEE, (1991), 13 pgs.

Bellotti et al., "Taking Email to Task: The Design and Evaluation of a Task Management Centered Email Tool," Proceedings of the SIGCHI conference on Human Factors in Computing Systems, ACM, 2003, vol. 5, issue 1, pp. 345-352.

Rekimoto et al., "Augment-able Reality: Situated Communication through Physical and Digital Spaces," Second International Symposium on Wearable Computers, Digest of Papers, IEEE, 1998, pp. 68-75.

Anonymous, "100% of companies using CLARITY FSR(TM) for their SEC XBRL submission successfully file without any EDGAR XBRL validation errors," Canada NewsWire, Ottawa, Aug. 17, 2010, 2 pages.

Brands, "XBRL tools can help," Strategic Finance, 94(5), Nov. 2012, 3 pages.

Business Wire, "Ez-XBRL Solutions Releases Enhanced XBRL Validator," Business Wire, May 17, 2011, 2 pages.

Corefiling, "Magnify Edgar Filings with Confidence," CoreFiling Precision Reporting, 2013, 3 pages.

Mahoney et al., "Creating XBRL Instance Documents in Excel," The CPA Journal Online, <http://www.nysscpa.org/cpajournal/2007/707/essentials/p66.htm>, Jul. 2007, 6 pages.

* cited by examiner

METHOD AND SYSTEM FOR GENERATING AND UTILIZING PERSISTENT ELECTRONIC TICK MARKS

CLAIM OF PRIORITY AND RELATED APPLICATIONS

This application is a continuation of and claims the benefit of priority under 35 U.S.C. §120 to U.S. patent application Ser. No. 12/614,217, filed on Nov. 6, 2009, entitled "Method and System for Generating and Utilizing Persistent Electronic Tick Marks," which claims the benefit of priority under 35 U.S.C. §119(e) to U.S. Provisional Patent Application Ser. No. 61/112,402, filed on Nov. 7, 2008, entitled "Method and System for Generating and Utilizing Persistent Electronic Tick Marks," the benefit of priority of each of which is claimed hereby, and each of which are incorporated by reference herein in its entirety.

TECHNICAL FIELD

The present disclosure relates generally to tools and techniques for data management, and more specifically, to systems and methods for annotating electronically-stored data with user-viewable, machine-readable, persistent, electronic tick marks.

BACKGROUND

When performing an audit, it has long been conventional for auditors to prepare schedules, analyses, transcriptions, memos, and confirmation results to be included in one or more documents generally referred to as work papers. These work papers serve as the basis for documenting the work performed by the auditor during the auditor's examination and evaluation of an entity's accounting and/or financial records—in the case of a financial audit—or, policies and operations—in the case of an internal or compliance audit. The work papers may ultimately be relied upon to support an auditor's opinion regarding the financial "fairness" of the financial statements, or an opinion expressing the extent to which an entity is in compliance with a certain set of internal or external policies and regulations.

During the audit process, it is customary for auditors to manually (e.g., by hand) annotate the work papers with various symbols, commonly referred to as tick marks, to convey certain information about the audit process. For example, as illustrated in FIG. 1, an auditor may place a checkmark symbol 10 next to a particular item in the work papers 12 to indicate that the auditor examined corresponding source documents 14 related to the particular item. If, for example, the item in the work papers is a brief statement regarding the value of a particular financial asset, a checkmark symbol 10 placed next to the brief statement may be used to indicate that the auditor has verified the accuracy of the brief statement by examining one or more supporting financial documents 14 associated with the corresponding financial asset. Different tick mark symbols may be used to convey different information about the audit process. The meaning of each type of tick mark can typically be found in a tick mark legend 16, which is often included with or attached to the work papers 12.

Although tick marks have long been associated with the audit process, tick marks are also frequently used by internal accounting personnel when preparing documents, such as regulatory filings. Despite the increased reliance on modern computer and software systems for preparing documents and performing audit-related tasks, the practice of using tick marks has changed very little. For instance, when using conventional database, document processing and spreadsheet applications to prepare documents and/or perform audit-related tasks, accounting personnel and auditors will frequently utilize one or more numbers, letters or symbols, such as an asterisk ("*"), as electronic versions of tick mark symbols. In some cases, the Microsoft Wingdings® font, which renders characters as a variety of symbols, is used to represent various tick mark symbols. In any case, the characters representing the tick mark symbols are typically generated within the framework of whatever conventional document processing or spreadsheet application is being used. For example, using a spreadsheet application, an auditor may place an asterisk ("*") in a cell of a worksheet to convey some information about a value in a neighboring cell of the worksheet.

Utilizing electronic tick mark symbols with conventional database, document processing and spreadsheet applications poses a variety of problems. First, with conventional database, document processing and spreadsheet applications, it is extremely easy to modify data and/or create a new copy or version of a document or file. Consequently, a tick mark symbol present in one version of a document or file may become lost or corrupt on subsequent versions of the document or file. Furthermore, an item or value presented in one document may be dependent (e.g., by means of a reference, formula, or link) upon an item or value in one or more other documents. Consequently, an item or value associated with a particular tick mark may change, thereby causing the tick mark and its corresponding legend to become irrelevant or invalid. In addition, the tick mark legend that explains the meaning of each tick mark symbol may become lost, disassociated or stale, thereby rendering tick marks included in a particular document or file irrelevant or invalid. Finally, even when a tick mark in a document or file is valid, the tick mark and its associated entry in the tick mark legend may not provide sufficient and relevant information regarding the validation and verification process, or the supporting documents, files and database items that have been referenced by an auditor. These shortcomings frequently cause unwanted errors, wasted efforts and higher costs associated with manually reviewing and re-reviewing successive versions of documents to ensure that they are correct.

BRIEF DESCRIPTION OF DRAWINGS

Some embodiments are illustrated by way of example and not limitation in the figures of the accompanying drawings in which.

DETAILED DESCRIPTION

Figure 1:
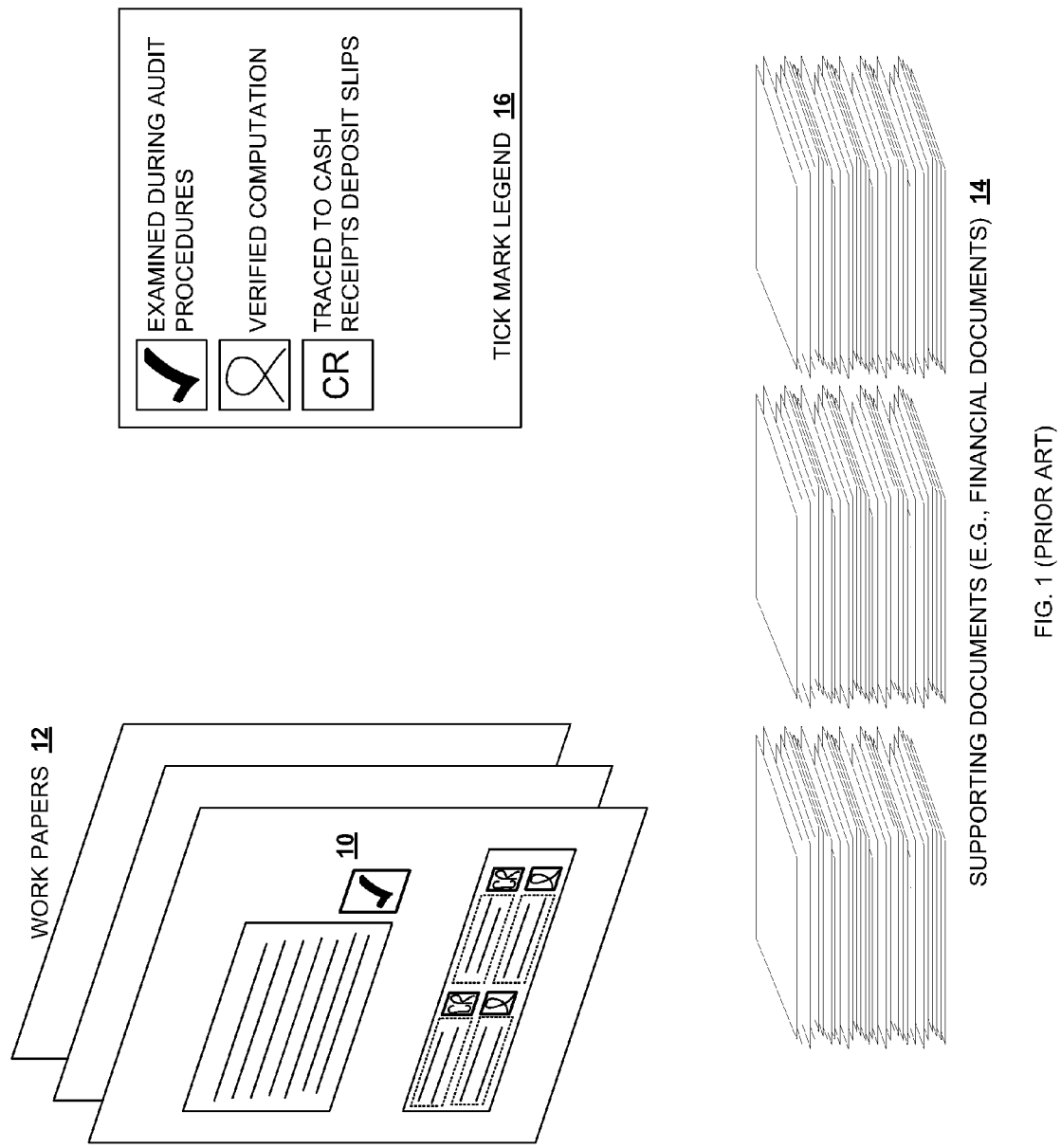
FIG. 1 illustrates an example of a tick mark legend and conventional audit-related work papers that have been annotated manually (e.g., by hand) with tick mark symbols.

Methods and systems for annotating electronically-stored data with user-viewable, machine-readable, persistent, electronic tick marks are disclosed. In the following description, for purposes of explanation, numerous specific details are set forth in order to provide a thorough understanding of the various attributes in example embodiments. It will be evident, however, to one skilled in the art that the present invention may be practiced without these specific details, or, with various combinations of the attributes described.

In one aspect, a computer-based data annotation tool for use with a document preparation application is provided. The data annotation tool enables a user of the document preparation application to annotate various document elements or items of data within a document by generating and positioning persistent (e.g., sticky) tick marks within the document. A tick mark is persistent in the sense that the tick mark is associated with and attaches to a particular value of a data item displayed within the document. As such, whenever the data item is retrieved from a database and presented via the document preparation application, the tick mark will be displayed with the data item. In the context of the present disclosure, a document element or item of data with which a tick mark may be associated includes, but is not limited to: a word, sentence, paragraph, number, chart, graph or figure.

A persistent tick mark may be displayed with a data item across numerous user sessions, within multiple sections of a document, or in any number of documents. Take for instance an example where a team of accountants are preparing multiple sections of a financial document to be filed with a government regulatory agency, such as the Securities and Exchange Commission (SEC). Utilizing a data annotation tool consistent with an embodiment of the invention, a first accountant, while preparing the enterprise's balance sheet, may place a tick mark next to a dollar amount representing the value of the enterprise's accounts receivable. In this example, the tick mark may convey information indicating that the first accountant has verified that the dollar amount for the accounts receivable is accurate. If, during a subsequent user session, a second accountant is preparing a different section of the document that also references the enterprise's accounts receivable, the tick mark placed by the first accountant will be displayed along with the dollar amount representing the value of the accounts receivable, even though the tick mark was originally added in a different section of the document (e.g., the balance sheet) during a previous user session.

In contrast to any number of conventional document annotation tools and techniques, a tick mark consistent with an embodiment of the invention is generated and stored in such a way that the tick mark is directly associated with and attached to a value of a particular item of data with which it is presented or displayed. For instance, in one embodiment of the invention, the tick mark and the item of data with which it is associated are stored in a common data structure. For example, the tick mark and associated data item may be two different components of a common XML (Extensible Markup Language) tag. Additionally, in one embodiment, the tick mark and its associated data item may be bound by a rule, referred to herein as a tick mark rule. A tick mark rule, for example, may indicate that a particular tick mark should be modified in some way when presented in a document, if the data item with which the tick mark is associated is ever modified. A tick mark rule may, for example, indicate that the graphical depiction (e.g., the actual symbol) of the tick mark is to change when the underlying value of the corresponding item of data changes. For instance, the color of a tick mark may change from green to red to indicate that the value to which the tick mark is attached has changed. Alternatively, the graphic symbol itself may change to indicate that the underlying value has changed. Accordingly, a user who is viewing a document subsequent to the initial placement of the original tick mark will immediately recognize a modified tick mark, and will therefore appreciate that the data item with which the now modified tick mark is associated has itself been modified subsequent to the placement of the original tick mark.

It should be noted that a tick mark consistent with an embodiment of the invention is associated with a data item, and attaches to the actual value of the data item. For example, a tick mark may be associated with a number representing the value of a particular asset. If, at the time the tick mark is generated and placed, the value of the asset is one-hundred twenty-five dollars ($125), then the tick mark attaches to the value of the item, that is, one-hundred twenty-five dollars ($125). This is in contrast to various conventional software applications which allow, for example, the placement of a graphical icon or other graphical element next to a data item, with no attachment to the value of the data item. For example, in various conventional spreadsheet applications a comment may be inserted into or associated with a cell to convey some information about the data in the cell, or in a neighboring cell. However, in such a case, the comment can only be said to be associated with the cell, or the neighboring cell. If, for example, the value within the cell changes, the comment will still be displayed. Similarly, if the data item within the cell is moved to another cell, the comment is not automatically moved as well.

Referring again to the example where a team of accountants are preparing financial documents to be filed with the SEC, a first accountant may place a tick mark symbol next to a dollar amount in the balance sheet representing the value of the enterprise's accounts receivable. If the value of the accounts receivable is derived using a formula, and the value of the accounts receivable is therefore dependent upon some other underlying values, a change to one of the underlying values may result in a change to the dollar amount representing the value of the accounts receivable. Accordingly, if such a change occurs and results in a change to the value of the accounts receivable, the tick mark symbol displayed along with the value of the accounts receivable will also change to indicate that the value of the accounts receivable has changed. Of course, if a value to which a tick mark has been attached is not dependent upon any underlying data, any direct change made to the value will also result in a change to the corresponding tick mark. For example, if a user simply edits the text representing the value, the resulting change to the value will trigger a modification to the tick mark symbol that is displayed along with the value. Accordingly, there are a number of reasons that a document element or item of data might change, thereby resulting in a corresponding change to an associated tick mark symbol.

Consistent with an embodiment of the invention, a tick mark is depicted as a graphical symbol and is presented, next to, on, or near the value of the data item with which it is associated and attached. In one embodiment, a computer-based data annotation tool may include a library of tick marks, where each tick mark in the library is a different graphical symbol and conveys different information. For example, one tick mark symbol may be used to convey that the user who placed the tick mark symbol has analyzed one or more external supporting documents or data sources to verify the accuracy of the value of the data item to which the tick mark symbol is associated and attached. Another tick mark symbol may indicate that the corresponding value of the data item is derived by a formula, and the presence of the tick mark indicates that a user has analyzed the accuracy of the formula, and/or the data on which the formula depends. Another tick mark symbol may indicate that an item of data has yet to be analyzed for accuracy. Another tick mark symbol may indicate that an item of data is being used within a document in the proper context. In yet another example, a tick mark symbol may be customized in some way to convey information indicating the source of the tick mark—for example, the user who placed the tick mark symbol. Each tick mark symbol in the library may be associated with a definition, which may be viewable by means of a tick mark legend. It will be readily apparent to those skilled in the art that any number of tick mark symbols may be used and defined via the tick mark legend.

In some embodiments, a tick mark symbol may be used to convey that a particular item of data is being used in the proper context. A tick mark symbol used in such a manner may be referred to as a contextual tick mark. For example, a contextual tick mark may be a symbol that, when positioned next to or near an item of data, indicates that the item of data is being used correctly within the document, in view of the overall context of the document and/or the particular portion of the document containing the item of data. In some instances, one or more rules or regulations may dictate that a document includes certain content, and/or that a document be formatted in a particular manner. Consistent with some embodiments of the invention, a contextual tick mark may be positioned next to an item of data to indicate that someone has confirmed that the item of data is being used properly in view of such a rule or regulation. Similarly, in some instances, it may not be readily apparent that a particular item of data is the correct item of data for use in a particular context. For instance, if a rule or regulation is requesting a particular financial data item, it may be confusing to the person preparing the document as to whether the correct item of data has been selected for display in a particular portion of the document. Accordingly, the person preparing the document may add a contextual tick mark next to a particular item of data, with a view to having an auditor or reviewer, verify that the item of data is in fact the proper item of data in the particular context of the document. During the review of the prepared document, the contextual tick mark previously positioned next to a data item can be manipulated, for example, by changing the color of the actual symbol or by adding a textual note or description, to indicate that the auditor or reviewer has confirmed the proper contextual use of the item of data.

In some embodiments, a particular type of contextual tick mark symbol may be used to indicate that certain metadata associated with an item of data displayed in a document is the correct metadata. For example, in some embodiments, human readable data elements displayed in a document may have computer-readable counterparts, for example, expressed in an XML-based language (i.e., eXtensible Markup Language). One particular language that may be used is referred to as the eXtensible Business Reporting Language, or XBRL. XBRL is an open data standard for financial reporting that allows information modeling and the expression of semantic meaning commonly required in business reporting. XBRL can be used to define and exchange financial information, such as might be included in a financial statement. Accordingly, consistent with embodiments of the invention, a tick mark symbol may be used to indicate that an auditor or document reviewer has reviewed an XBRL expression (e.g., XML element, tag, or attribute) that is associated with a particular data item displayed in a document, to ensure that the proper XBRL expression has been selected by the person preparing the document. Because XBRL expressions are generally computer-readable and therefore only processed by computers, passive users of XBRL data will generally not visually recognize errors. Consequently, verifying that a data item has been associated with a correct XBRL expression that is being used in the proper context of the document, and memorializing the verification with a tick mark symbol, has the effect of significantly reducing the potential of introducing errors in computer-processed documents. In various alternative embodiments, XML-based languages other than XBRL may be used. As such, tick mark symbols may be used to indicate the proper selection of XML expressions (e.g., tags or elements) for languages and schemas other than those associated with XBRL.

In some embodiments, a tick mark symbol displayed by the document preparation application may exhibit interactive characteristics. For example, when a user manipulates a pointing device or cursor control device (e.g., a mouse) to position a cursor over a tick mark symbol displayed in a document, a pop-up or fly-out window or text box, or some other graphical user interface element may be displayed. The graphical user interface element (e.g., pop-up or fly-out window) may display a variety of information (e.g., meta-data) related to the tick mark symbol and its corresponding item of data. For instance, a pop-up or fly-out window may include information such as: a name, username or some other identifier of the person who originally placed the tick mark, a textual comment or note provided by the person who originally placed the tick mark, a time stamp indicating the day and time when the tick mark was originally placed, or a link (e.g., hyperlink) to a supporting document or related item of data in a database. Naturally, other information may also be displayed in a pop-up or fly-out window. Some of the information shown in a pop-up or fly-out window may be automatically added by the data annotation tool when the tick mark symbol is originally placed. For instance, information indicating who placed the tick mark, and when, may be automatically added by the data annotation tool. Other information, such as user notes and links to supporting documents and data, may be added by the user.

As described in greater detail below, in one embodiment, a separate graphical user interface element may be used to display information associated with tick mark symbols. For example, a separate tool bar, window, information box or frame may display information associated with those tick mark symbols that are being displayed by the document preparation application. Accordingly, as a user scrolls through a document, the information displayed in the separate graphical user interface element (e.g., window or information box) may change as the number and type of tick mark symbols that are displayed changes.

In one embodiment of the invention, the document preparation application may include a display mode toggle mechanism to place the document preparation application in one of several display modes. For instance, in a first display mode, the document preparation application may display all information associated with tick mark symbols embedded or positioned within the document. Accordingly, when an item of data has a corresponding tick mark symbol attached to it, the tick mark symbol will be displayed with the item of data in the document. In a second display mode, the document preparation application may "hide" all tick mark symbols. This may be useful, for example, when a user wants to view the document without the distraction of the tick mark symbols, or when a user wants to print a document without printing the tick mark symbols. Similarly, when a document has been finally approved and is ready to file with a regulatory agency, it is necessary to enable the document preparation application to generate a version of the document suitable for filing, for example, without tick mark symbols. In yet another display mode, a user may select to have the document preparation application display only the tick marks that were generated and placed by a certain user or users, or within a certain period of time, or certain types of tick marks.

Although various aspects of the invention will find practical application in a wide variety of contexts, embodiments of the invention described herein are presented in the context of a multi-user, computer-based, document annotation system, which may be used, for example, in viewing and/or preparing one or more documents to be filed with a government regulatory entity such as the United States Securities and Exchange Commission (SEC), the Environmental Protection Agency (EPA), the Food and Drug Administration (FDA), or the Department of Energy (DOE), among others. Accordingly, the various persistent tick marks generated by the document annotation tool described herein may be used to convey the same type of information as is meant to be conveyed by the manual tick marks used by an auditor. Because each tick mark is generated and stored in such a way that the tick mark is directly associated with or linked to a particular data item or document element with which it is presented, those skilled in the art will recognize that various embodiments of the invention may prove beneficial in any number of multi-user application environments for which tight control over the modification of user-generated content is desirable. Various embodiments of the invention may be implemented for use with other types of data and/or document management systems, including, but not limited to: a website design application; or a wiki-based web-site design application.

Figure 2:
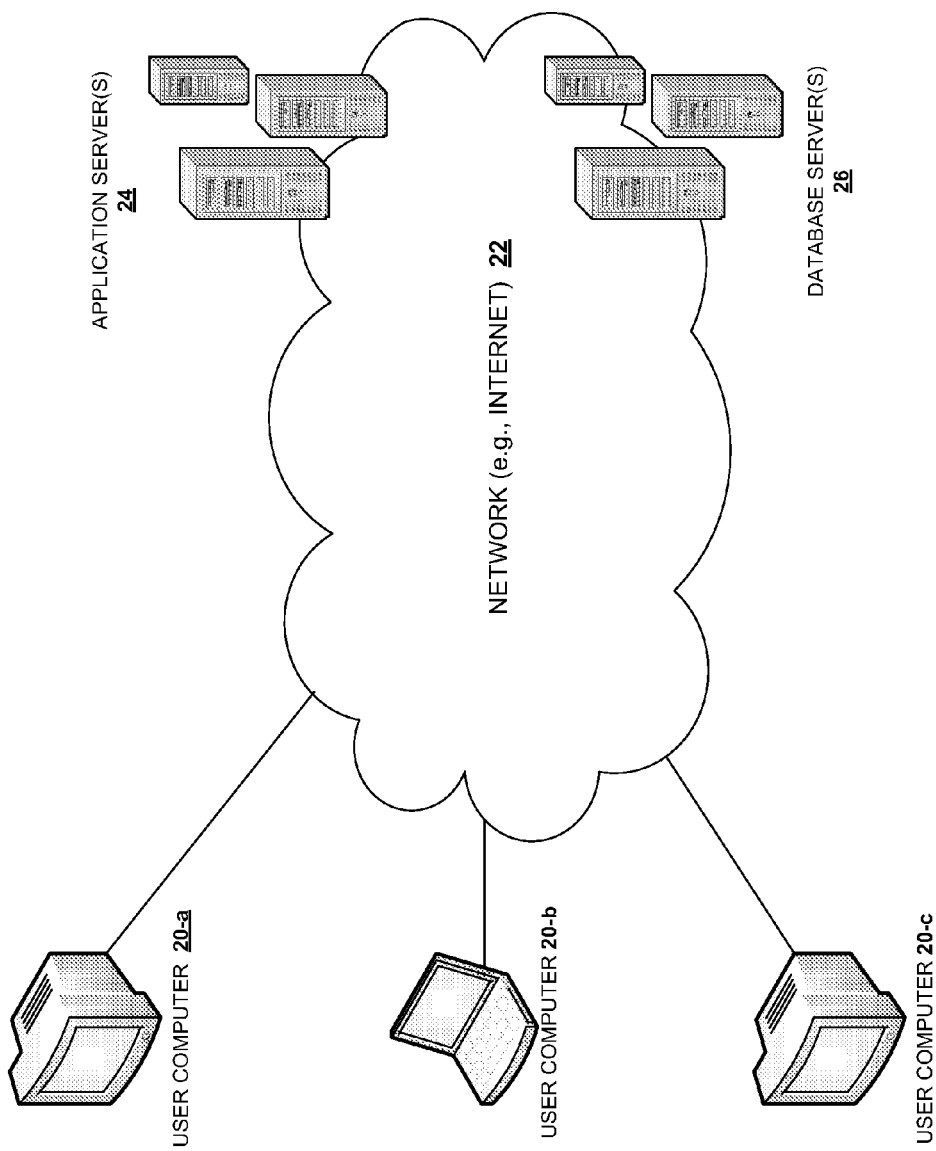
FIG. 2 is a block diagram illustrating at a system level the various computing devices with which a document annotation application may be implemented, according to an embodiment of the invention.

FIG. 2 is a block diagram illustrating at a system level the various computing devices with which a data annotation tool may be implemented, according to an embodiment of the invention. As illustrated in FIG. 2, an example data annotation tool may be implemented in a client-server framework and include one or more user computers (e.g., 20-a, 20-b, and 20-c) coupled to a network 22 that includes application servers 24 and database servers 26. In one embodiment of the invention, each user computer 22 executes a conventional web browser application which receives, renders and displays internet documents received from the application server(s) 24. The application servers 24 retrieve data from the database servers 26 and other content sources, and communicate internet documents to the web browser applications executing on the user computers 20. Accordingly, in one embodiment, one or more application servers 24 may be, or include, a web server or content server for serving content to the web browser applications executing on the user computers 20. In addition, application logic in the form of executable or interpretable instructions may be communicated from the application servers 24 to the user computers where the application logic is executed or interpreted by a client-side application, such as a conventional web browser application, or browser plug-in. In this way, documents displayed in a conventional web browser window may be edited and tick mark symbols can be embedded within the documents, while storing any user edits and tick marks at a server or database on the network. In an alternative embodiment, instead of a conventional web browser application, a proprietary client application may be used on the user computers to receive, render and edit documents.

In one embodiment of the invention, the data annotation tool may be provided as an integrated software component or service that is part of a document preparation application. Alternatively, the data annotation tool may be a standalone application that operates in conjunction with any of a variety of conventional document preparation or processing applications. When implemented as an integrated solution, the document preparation application and data annotation tool may be made available to consumers under a conventional software license, or as a subscription-based service. Accordingly, the document preparation application and data annotation tool may execute on and utilize application servers and database servers that are owned and maintained by the enterprise providing the data annotation tool, or alternatively, by a third party who provides utility computing resources. Furthermore, although FIG. 2 depicts a client-server framework, an embodiment of the invention may be implemented as a standalone application, for example, residing and executing on a single user computer.

Figure 3:
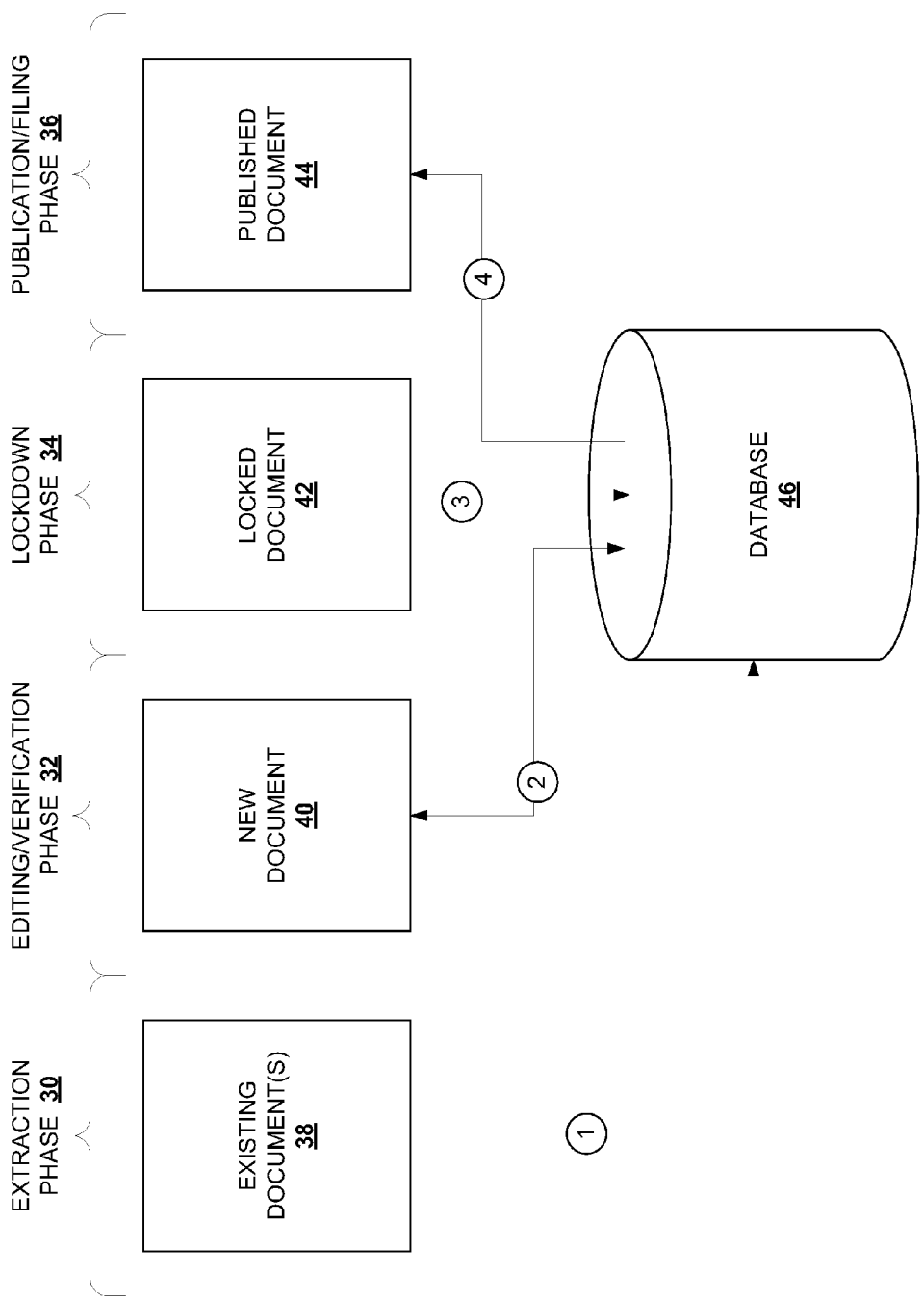
FIG. 3 illustrates an example of the document processing flow that may occur with a document preparation application having an integrated data annotation tool, according to an embodiment of the invention.

FIG. 3 illustrates an example of the document processing flow that may occur with a document preparation application having an integrated data annotation tool, according to an embodiment of the invention. As illustrated in FIG. 3, consistent with one embodiment, processing data to generate a document that conforms to the requirements of a particular government regulatory agency includes four distinct phases. In phase one 30, data from an external database or from one or more existing documents 38 are extracted by the document preparation application and stored in a database 46 of the document preparation application. During the extraction phase 30, the extracted data may be filtered and manipulated so that the data can be properly formatted and inserted into the database 46 in a manner that is useful to the document preparation application.

The second phase 32 of the document preparation process involves generating a new document 40 based on a document template, and then enabling users of the document preparation application to access, edit and verify various elements of the newly created document 40. It is during this second phase 32 when users of the document preparation application will utilize the data annotation tool to position various tick mark symbols and associated meta-data throughout the document. The exact workflow that is utilized during the editing and verification phase is often dependent upon internal document preparation procedures of the enterprise that is utilizing the document preparation application and data annotation tool. For example, a first team of internal accountants may initially edit the document before a second team of accounts performs a verification process to verify the accuracy of various elements of the document. In any case, during the editing and verification phase 32, users of the document preparation application can use the data annotation tool to place tick mark symbols next to various items of data displayed in the document. These tick mark symbols attach to the particular items of data. Consequently, the tick mark symbols are displayed when any user requests a document that includes that particular item of data. This allows a first user to quickly convey information about a particular document element to another user, and so on. If, for example, a first user has verified the accuracy of a data item in a particular document, adding a tick mark symbol to the data item will convey to other users that the data item has already been verified. In this way, work duplication can be kept to a minimum without sacrificing quality controls.

At some point in the document preparation process, after the document has been edited and verified, the document is determined to be in a finalized state (e.g. ready for printing, publishing or filing with a regulatory agency). Accordingly, during the third phase 34—the lockdown phase—the document is automatically verified and a locked document 42 is created. For example, in one embodiment, all document elements or items of data with corresponding tick marks are automatically verified to ensure that they have not changed since the corresponding tick mark was placed. As described in greater detail below, this generally involves processing a tick mark rule associated with the tick mark. In one embodiment, a tick mark rule is considered to be satisfied if the item of data with which the tick mark is attached has not been modified since the time the tick mark was initially generated and placed. Only if each tick mark rule is satisfied is the document locked. Once the document is locked, users of the document preparation application are generally prohibited from accessing a writable copy of the document, or any data included in the document. Accordingly, the underlying data, which may be stored separately in the database 46, are locked (e.g., stored in a non-writable manner) and associated with the locked document. If a user attempts to access an item of data that is included in the document, the user may be provided a read-only copy of the item of data, but cannot modify the item of data.

Finally, during the publication and filing phase 36, a final copy of the document is generated (e.g., a published document 44). In one embodiment, the document preparation application may process the data included in the document in order to filter out any visible or invisible meta-data, including tick mark symbols. In one embodiment, the document preparation application or the data annotation tool may have an administrative interface that enables a user to select various levels of meta-data filtering to be used when processing the data to generate a final published document. In some cases, for example, it may be necessary to "strip" all meta-data from the document. This may be required, for example, when printing a physical hard copy of a document that is to be submitted in hard copy form, or, when generating an electronic or soft copy that may have sensitive meta-data that would be undesirable to provide to a third party. However, in other cases, it may be beneficial to leave machine-readable meta-data within an electronic or soft copy of the document, while removing any user-viewable meta-data. Accordingly, the meta-data filtering mechanism can be customized or tailored to fit the requirements of the entity for which the document is being generated. Finally, in one embodiment of the invention, the document preparation application may include logic for facilitating the automatic or semi-automatic submission or filing of a document to an online filing system operated by a regulatory agency. This may occur during the publication/filing phase 36.

Figure 4:
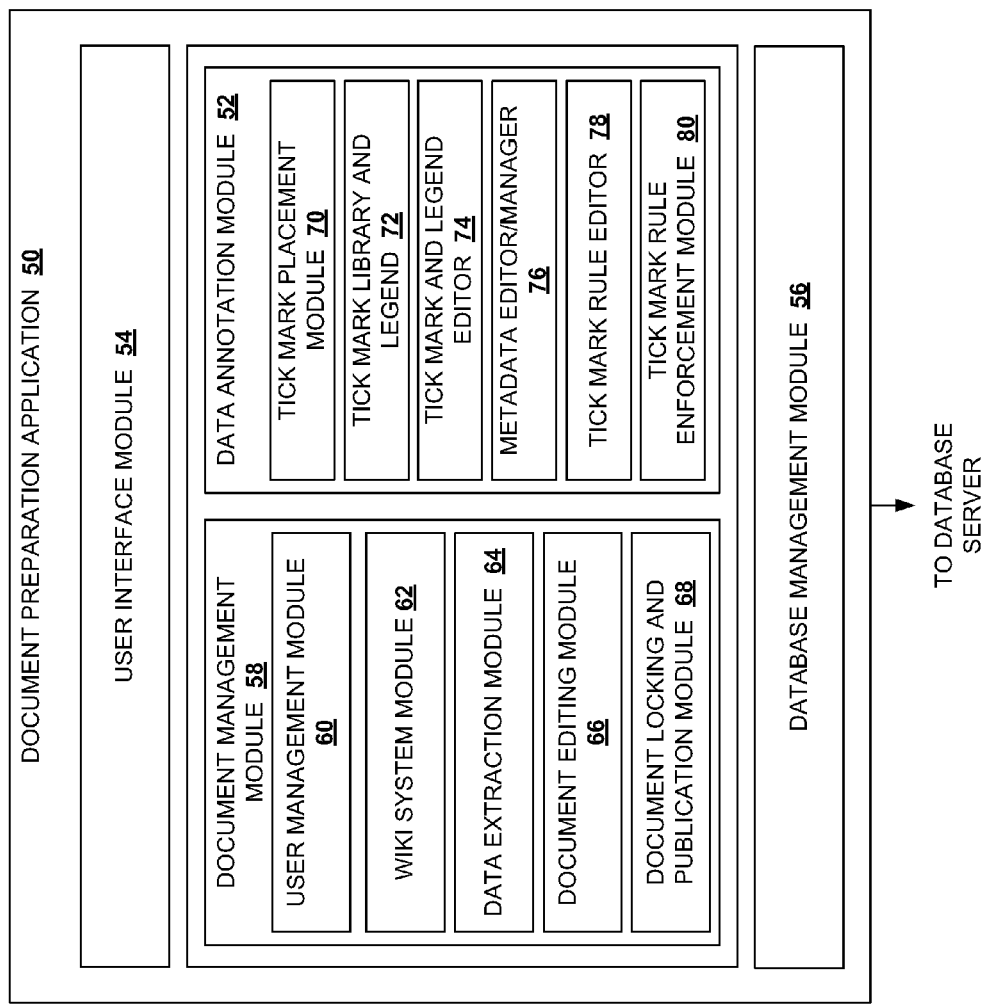
FIG. 4 is a functional block diagram illustrating various functional components of a document preparation application with an integrated data annotation tool for generating and utilizing electronic, persistent tick marks with electronically stored data, according to an embodiment of the invention.

FIG. 4 is a functional block diagram illustrating various functional components of a document preparation application with an integrated data annotation tool for generating and utilizing electronic, persistent tick marks with electronically stored data, according to an embodiment of the invention.

Although aspects of the invention might be implemented in hardware, software or a combination thereof, each module or functional component illustrated in FIG. 4 represents an executable code module (e.g., a set of instructions) consistent with an embodiment of the invention. The code modules depicted in FIG. 4 may reside on an application server 24 or a user-computer 20, and may be executed by either an application server 24 or a user computer 20. For example, in a client-server framework, some of the code modules will reside and execute on a client (e.g. user computer 20) and some will be reside and execute on an application server 24. In any case, when executed, the various code modules perform the functions described below.

As illustrated in FIG. 4, in one embodiment, the data annotation tool for generating tick marks may be integrated with a document preparation application 50. For instance, in FIG. 4 a data annotation module 52 (representing the executable code or logic portion of the data annotation tool) is shown to be a sub-component of the document preparation application 50. As such, the data annotation module 52 is shown to be integrated with the document preparation application 50. Those skilled in the art of software design will readily recognize that the data annotation module 52 of FIG. 4 may be implemented as a stand-alone application, or as a plug-in, or in some other form such that it can be used in conjunction with a conventional document processing application.

Referring to FIG. 4, the document preparation application 50 includes a user interface module 54, a database management module 56, a document management module 58, and a data annotation module 52. In general, the user interface module 54 provides the logic necessary for causing internet documents to be displayed on a user computer. Accordingly, in one embodiment, the user interface module 54 may serve as an interface to a collection of data content, including internet or World Wide Web documents, or portions thereof. The user interface module 54 may, for example, interface with a web server or content server (not shown) such that the internet documents are served to a user computer by the web server or content server in response to a request for content. In addition, the user interface module may provide an administrative interface to either the document preparation application or the data annotation tool, or both. The administrative interface, for example, may allow an administrator to customize various features and establish configuration settings for different aspects of the document preparation application 50 and the data annotation tool.

The database management module 56 may serve as an interface to one or more database servers 26, and in turn, one or more databases 46. Accordingly, data that are processed by the various functional components of the document preparation application 58 and/or data annotation module 52 may be stored in, or retrieved from, a database 46 via the database management module 56.

The document management module 58 includes application logic for managing, processing, editing and presenting data, and in particular, data in the form of documents. As illustrated in FIG. 4, the document preparation application 50 includes a user management module 60. In one embodiment, the document preparation application 50 is a role-based, multi-user system. Accordingly, the user management module 60 provides logic for establishing authentication information (e.g., usernames and passwords) for users, authenticating users based on the authentication information, and enforcing the various access privileges associated with the authentication information of each user. For example, in a role-based system, each user may be assigned a role that determines his or her access privileges for accessing data and performing various operations facilitated by the document preparation application 50. Accordingly, different roles may be created for internal accountants, managers, external auditors and so on. Based on the access privileges associated with a role assigned to a particular user, the particular user may be allowed to edit certain data and annotate the data, for example, by associating a tick mark with the data. Additionally, access privileges may be associated with other administrative and non-administrative features of the application, such as creating customized tick mark symbols within a particular tick mark library, managing (e.g., by adding to, or modifying) the tick mark legend associated with a particular tick mark library, editing the default metadata that is automatically associated with a tick mark symbol, locking a document, and/or publishing, printing or filing a document.

In one embodiment, the document preparation application 50 is a wild-based system. As such, the document management module 58 includes a wiki system module 62. In general, wild software is a type of collaborative software that runs a wiki system, allowing content (e.g., documents or web pages) to be created and edited using a conventional web browser application. A wiki-based system may be implemented on or with an application server that is integrated with one or more web servers. With a wiki-based system, the content is typically stored in a file system, and changes to the content are stored in a relational database management system. As users edit and modify various document elements, any changes are captured in such a way as to allow the changes to be displayed, along with the time when the changes were made, and the source of the change (e.g., the name or username of the user who made the change).

Referring again to FIG. 4, the document management module 58 includes a data extraction module 64, a document editing module 66 and a document locking and publication module 68. As described in connection with FIG. 3, in one embodiment, preparing a document with the document preparation application 50 is a four phase process. For instance, as illustrated in FIG. 3, the four phases include an extraction phase 30, an editing and verification phase 32, a lockdown phase 34, and a publication/filing phase 36. During the extraction phase 30, the data extraction module 64 (of FIG. 4) extracts relevant data from one or more existing documents 38 and/or external databases. If, for example, an enterprise has previously prepared a document for filing with a regulatory agency, data from the document may be extracted to be used within a new document. In one embodiment, a document template provides a basic document structure and includes references to document elements or items of data that are stored within the database. Those document elements may originate, for example, from the data extraction phase 30. Accordingly, the data extraction module 64 identifies relevant data, extracts that relevant data, filters the data and stores the relevant data in a database for use within one or more new documents.

As illustrated in FIG. 4, the document management module 58 includes a document editing module 66. During the second phase 32 of document preparation the document editing module 66 enables a user to display, edit and verify data in various documents. It is during the editing and verification phase 32 when tick mark symbols may be associated with various items of data or document elements. Once a new document 40 has been established, users may edit and or verify various elements within the document. In one embodiment of the invention, the document editing module 66 operates in close conjunction with the wiki system module 62 to ensure that all edits to the new document are captured in a database 46. During this phase, users may insert tick mark symbols that will attach to certain document elements. For instance, a user may select a particular tick mark symbol from a library of tick mark symbols to convey some particular information about the document element with which the tick mark is associated. Accordingly, other users of the application who are familiar with the various tick mark symbols will quickly ascertain the meaning of the tick mark symbol as it relates to the particular corresponding document element or item of data.

At some point in the document preparation process, all of the essential data are entered and appropriately verified. At this time, the third phase—the lockdown phase 34—is entered. The document management module 58 includes a document locking and publication module 68. The document locking and publication module 68 facilitates "locking" a document and its corresponding data so as to prevent any further changes to the document and its data. During the lockdown phase 34, all of the tick mark rules associated with tick mark symbols included in the document may be executed to ensure that no data has been modified since the time when a tick mark symbol was associated or attached with that item of data. If a tick mark rule is satisfied (or fails, depending on how the condition of the rule is stated), indicating that a value for an item of data has changed since the initial tick mark was first generated and placed, the document locking operation is temporarily suspended and one or more users may be notified. For example, a message or email may be communicated to a certain administrative user(s) of the document preparation application 50 to inform the user that a lock down operation has failed. This provides the user with an opportunity to re-verify an item of data displayed in the document.

The document locking and publication module 69 may also enable a user to lock a document element or item of data during the editing and verification phase 32. For example, in one embodiment, document elements may be locked without locking the entire document. If, for example, a user has verified a particular document element and would like to prevent any changes to the document element, the user can lock that document element without affecting any other portions of the document. By locking the document element, the document element essentially becomes read-only.

The data annotation module 52 includes the various code modules associated with and implementing the functionality of the data annotation tool. For instance, as illustrated in FIG. 4, the data annotation module 52 includes a tick mark placement module 70, a tick mark library and legend 72, a tick mark and legend editor 74, a metadata editor and manager 76 a tick mark rule enforcement module 78 and a tick mark rule editor 80.

The tick mark placement module 70 provides the functionality for generating and placing a tick mark within a document, and attaching the tick mark symbol to a particular item of data. This includes, for example, interpreting user input received at a user computer to determine which item of data within a document a tick mark symbol is to be associated with, making the association, and storing a representation of the tick mark symbol in such a way that ensures the persistent nature of the tick mark. In addition, the tick mark placement module 70 automatically associates any system-supplied meta-data with the tick mark.

In one embodiment, the tick mark library and legend 72 include the logic and data for managing, storing and organizing the various tick mark symbols or graphical icons, and their corresponding definitions. For example, the tick mark library 72 may provide a variety of default tick mark symbols that can be placed within a document. Each tick mark symbol may have its own meaning. For example, one tick mark symbol, such as a simple checkmark, may be used to indicate that an item of data displayed within a document has been verified. Accordingly, a checkmark symbol displayed next to a number representing the value of an enterprise's accounts receivable may indicate that the user who placed the checkmark symbol has verified the accuracy of the number representing the value of the accounts receivable. Of course, the number and meaning of the tick mark symbols is dependent upon a particular implementation and the context in which the document preparation application is being used. The tick mark symbols and their meanings will likely be different in the context of preparing a document to be filed with the SEC as compared with preparing a document for some other purpose.

The user interface 54 of the document preparation application may provide access to the tick mark library and legend 72 in a variety of ways. For example, a tool bar, or drop down menu present in the main window of the application may provide a link to a user interface element displaying the various tick marks available to a user, and their corresponding meanings. In one embodiment, the user interface element displaying the tick mark symbols may be a window, frame or information box.

Although depicted in FIG. 4 as a single tick mark library and legend 70, in one embodiment, multiple tick mark libraries and legends may exist. For example, in an embodiment of the document preparation application provided as a subscription service, each enterprise that subscribes to the service may be assigned its own tick mark library. Initially, the tick mark library may be populated with a variety of default tick mark symbols. However, over time, additional tick marks may be added to the tick mark library. New tick mark symbols may be generated and defined using the tick mark and legend editor 74. For instance, the tick mark and legend editor may provide a tool for customizing the look of a graphical symbol. In addition, a custom definition may be assigned to each custom tick mark symbol. Accordingly, users may generate custom tick mark symbols to convey whatever type of information they desire. The tick mark legend 72 provides a user-viewable definition for each tick mark symbol included in a tick mark library. Accordingly, if a user is not immediately familiar with the meaning of a particular tick mark, a user may access the tick mark legend to view a definition associated with a given tick mark. Accordingly, if a user has created a custom tick mark to convey some information, for example, the user can include that information about the tick mark in the tick mark legend 72. In one embodiment, creating custom tick marks and adding corresponding definitions to the tick mark legend 72 is allowed only by a user with special access privileges, such as an administrator of the application. In an alternative embodiment, any user, subject to access privileges, may be allowed to generate a custom tick mark symbol and definition.

When a user attaches a tick mark to a particular item of data or document element, additional meta-data beyond the tick mark are automatically generated and associated with the item of data or document element. For example, in one embodiment, each time a tick mark is placed in a document, the name or username of the user who placed the tick mark is automatically associated with the tick mark symbol and the corresponding document element. Additionally, a time stamp indicating the day and time the tick mark symbol was generated and placed is also automatically associated with the tick mark symbol and corresponding document element. Accordingly, when a tick mark symbol is displayed in a document, the additional automatically generated meta-data associated with the tick mark symbol can also be viewed. For example, a pop-up or fly-out window may appear when a mouse-over event is detected, such that the pop-up or fly-out window displays the additional meta-data, such as the username of the person who placed the tick mark symbol and the day and time it was placed. In one embodiment, a pop-up or fly-out window that is presented during a mouse-over event may include a link to the definition of a tick mark as included in the tick mark legend.

In addition to meta-data that is automatically generated by the data annotation tool, in one embodiment a user may provide additional meta-data that may be displayed in a pop-up or fly-out window. For example, a user may provide a comment or note providing additional information about why the tick mark symbol has been associated and attached to the corresponding item of data. In addition, the user may provide a link to some external item of data. For instance, a hyperlink to an external document or data source may be provided, such that the hyperlink is displayed in a pop-up or fly-out window when a user manipulates a cursor to interact with a tick mark symbol (e.g., a mouse-over event).

The meta-data editor/manager 76 provides logic to facilitate managing and editing the meta-data associated with each tick mark symbol. For example, using the meta-data editor/manager, a user can select the type of meta-data that is automatically associated with a tick mark symbol and displayed with the tick mark symbol when the tick mark is presented in a document. For example, in certain scenarios, anonymity may be desired. Accordingly, an administrator can select whether or not the username of the person that placed the tick mark should automatically be added as an item of meta-data. In addition, the meta-data manager 76 may allow an administrator or user to determine whether or not additional user-provided meta-data is allowed to be associated with a particular tick mark symbol, or type of tick mark symbol.

In one embodiment, a tick mark rule editor 78 provides the logic for generating and associating tick mark rules with different tick mark symbols. A tick mark rule is a rule, specified in one embodiment as a condition and action pair, such that when the condition is satisfied, the action is performed. Tick mark rules are used primarily to ensure that data associated with a tick mark symbol are not unknowingly modified. In one embodiment, each tick mark symbol is associated with a default tick mark rule. The default tick mark rule may, for example, indicate that whenever the item of data associated with the tick mark changes, the tick mark symbol displayed with the item of data is to be modified when presented with the modified item of data. For example, a tick mark symbol when initially attached to an item of data may be a particular color, such as green. The tick mark rule may indicate that the color of the tick mark symbol is to be modified if the value of the item of data is modified. Accordingly, any change to the value of the item of data will cause the tick mark symbol to be displayed in a different color, for example, the color red, as opposed to its original color green. Hence, a user viewing a document that includes a red tick mark symbol next to an item of data will immediately recognize that the red tick mark symbol indicates that the item of data has been modified since the original tick mark was placed. If desired, the user can investigate what caused the change to the item of data, and if necessary, verify that the modified data is accurate. In some embodiments, in addition to changing the color of a tick mark to indicate a change to an item of data, the actual symbol or shape of the graphic that represents the tick mark may be modified to indicate that an item of data has changed. For instance, a "+" or "−" symbol may be shown in conjunction with another symbol to indicate that a value has increased or decreased. In yet another example, the shape or symbol may change altogether to indicate a change has occurred to an item of data.

The tick mark rule editor 78 can be used to specify the condition part of the rule, as well as the action. For example, in one embodiment, the condition can be established such that any change in a document element will automatically satisfy the condition, and thus, cause a modified tick mark symbol to be displayed. Alternatively, when dealing with numbers, a condition may be specified such that only a substantial difference (as specified in the rule) will satisfy the condition portion of the tick mark rule. This is useful, for example, when dealing with values that are derived with formulas and negligible changes are detected in the derived values. For example, if the value of an accounts receivable changes from "$1,987,345.12" to "$1,987,345.10", representing a difference of only two cents, this change may be considered negligible and not necessitate a change in the tick mark symbol that is displayed in the document with the accounts receivable. Accordingly, in one embodiment, the condition portion of a tick mark rule can be customized in a variety of ways.

In addition to specifying the condition portion of a tick mark rule, a rule editor 78 may be used to specify the particular action to be taken should the condition of a rule be satisfied (or not satisfied). Generally, the action specified will indicate a particular tick mark symbol to be displayed if a condition is satisfied (or not satisfied). For example, as noted above, an action may specify that a tick mark symbol of a different color is to be displayed if the value corresponding with the tick mark changes. Instead of displaying the same tick mark symbol in a different color, a tick mark rule may specify that an all together different tick mark symbol is to be displayed if a document element has changed. For instance, a check-plus symbol (a checkmark with a "+") may be used to convey some information about a corresponding item of data. In this case, the checkmark symbol may indicate that the corresponding value has been verified, while the "+" portion of the symbol indicates that the value of the document element or item of data has not been modified since the tick mark symbol was initially placed. If, however, the value is modified, the tick mark symbol may be modified as well. For instance, a check-minus (a checkmark with a "−") may be used to indicate that a value was originally verified but has since changed. The check-plus and check-minus symbols presented herein are simply provided as examples. Those skilled in the art will immediately recognize that any number, variety, color, and shape of symbol might be used as tick mark symbols, consistent with an embodiment of the invention, to visually convey information.

The tick mark rule enforcement module 80 evaluates tick mark rules, and performs an action specified in a tick mark rule when a particular condition is satisfied (or not satisfied). Accordingly, when a document is requested, or when a data query is processed, the requested data is analyzed to determine whether the data has been associated with a tick mark symbol. If a tick mark symbol has been associated or attached to the particular item of data, the tick mark rule enforcement module 80 evaluates the tick mark rule associated with the tick mark to determine if the condition portion of the rule has been satisfied. In this case, a satisfied condition indicates that a document element has been modified since the time when the initial tick mark symbol was attached with the value. Of course, in an alternative embodiment, a condition may be specified such that the condition is satisfied if a corresponding value has not been changed. In any case, the tick mark rule enforcement module 80 ensures that the proper tick mark symbol is displayed in a document, and/or with an item of data, based upon any changes that may have occurred to the document or data.

Although not depicted in FIG. 4, in one embodiment of the invention, a query processing tool may be included as a component of the data annotation module 52. In general, the query processing tool enables a user to specifically query a database for individual items of data or document elements, without requesting the entire document. For example, a user may desire to view a list of document elements, without actually viewing the document. The query processing tool provides this functionality. When a document element or item of data satisfying the query is associated with a previously placed tick mark symbol, the tick mark symbol and any associated meta-data is returned in the results of the query. In addition to querying data included in documents, an embodiment of the query processing tool may also facilitate the querying of meta-data. For instance, using the query tool, a user may specify that a list be generated to include all document elements that have been tagged with a tick mark symbol by a particular user. Similarly, a query may request a list of document elements that were tagged with a tick mark symbol during a specified time period. Again, the underlying document elements and any meta-data, including the tick mark symbol, will be displayed in the results of such a query.

Figure 5:
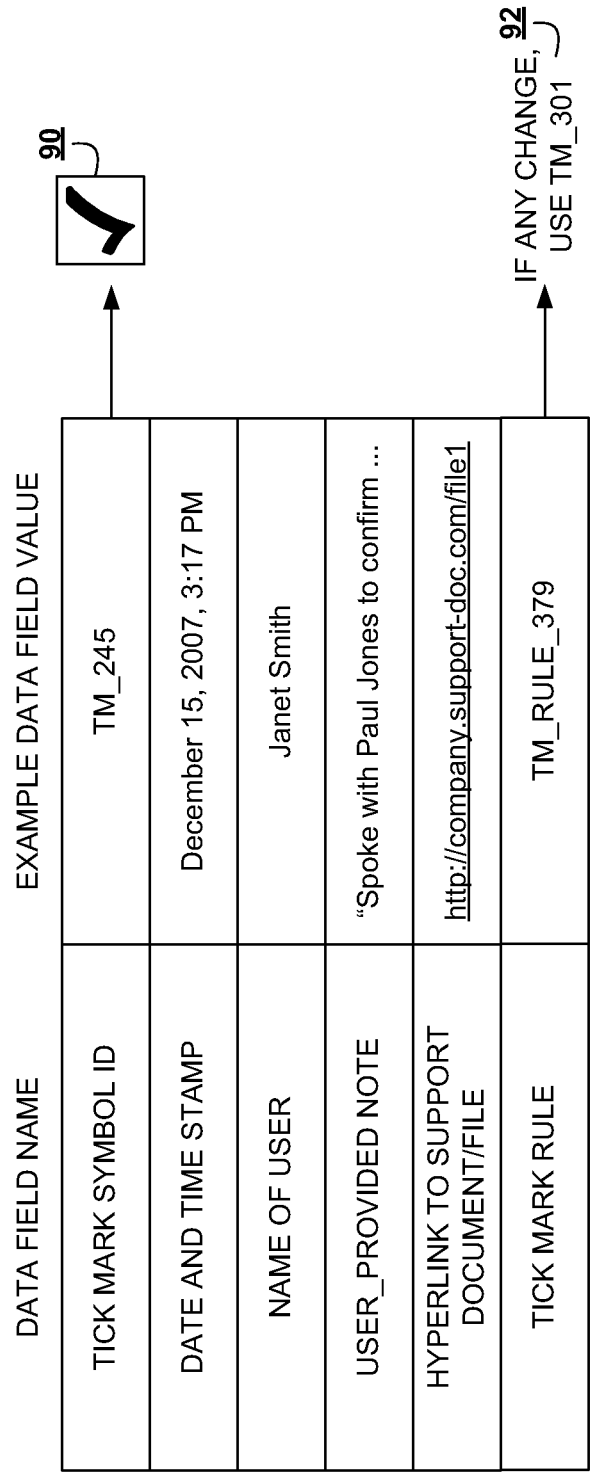
FIG. 5 is a diagram of an example data structure for use in representing an electronic, persistent tick mark, according to an embodiment of the invention.

FIG. 5 is a diagram of an example data structure for use in representing an electronic, persistent tick mark, according to an embodiment of the invention. The data structure shown in FIG. 5 is provided to illustrate the nature of the data, in contrast to any particular format. In one embodiment, for example, the data comprising a tick mark may be stored as an XML tag that conforms to a particular standard, such as the XBRL (eXtensible Business Reporting Logic) specification, or any other XML-based standard. Alternatively, the format of the data may be dependent upon a programming language used to implement the data annotation tool. Those skilled in the art will readily appreciate the various structures and formats that might be utilized in representing a tick mark consistent with aspects of the invention.

As illustrated in FIG. 5, the data structure representing a tick mark symbol includes five data field names with corresponding example data field values. The first field, referred to in FIG. 5 as the "TICK MARK SYMBOL ID" indicates the specific graphic symbol that is to be displayed. For example, the field value may be a graphic symbol identifier, such as "TM_245", which identifies a graphic symbol in a tick mark library. In the example of FIG. 5, the tick mark identifier, "TM_245", corresponds with a checkmark symbol 90.

The second field in the example data structure of FIG. 5 is used to store system-supplied meta-data indicating the day and time that the tick mark symbol was attached to the item of data (e.g., originally placed in the document). For example, in FIG. 5, the "DATE AND TIME STAMP" field is shown to have the value "Dec. 15, 2007" indicating that the representative tick mark was generated and/or attached to an item of data on Dec. 15, 2007. The third field in the example data structure of FIG. 5 is also a system-supplied meta-data item. The field referred to in FIG. 5 as "NAME OF USER" indicates the name of the user, Janet Smith, who attached the tick mark symbol to the corresponding item of data.

The next two data fields are examples of user-supplied meta-data. For example, the data field with name "USER_PROVIDED NOTE" is used to store a note or comment provided by the user. Similarly, the field in FIG. 5 with name "HYPERLINK TO SUPPORT DOCUMENT/FILE" stores a hyperlink to a supporting data source, such as a document.

Finally, the last field of the data structure illustrated in FIG. 5 is a field for storing a reference to a tick mark rule. In this example, the field "TICK MARK RULE" has a value "TM_RULE_379" which references a particular tick mark rule. As indicated by the text with reference number 92 in FIG. 5, the tick mark rule indicates that any change in the data item with which the tick mark is attached, causes the tick mark symbol with tick mark associated with tick mark ID, TM_301" to be displayed, when the item of data is displayed. Of course, a variety of additional meta-data may be included in a data structure representing a tick mark symbol according to an embodiment of the invention.

Although the data structure in FIG. 5 shows the tick mark rule as a component of the data structure for the tick mark symbol, in an alternative embodiment, a default rule may be used. As such, the tick mark rule need not necessarily be included as a field in the data structure representing the tick mark symbol.

Figure 6:
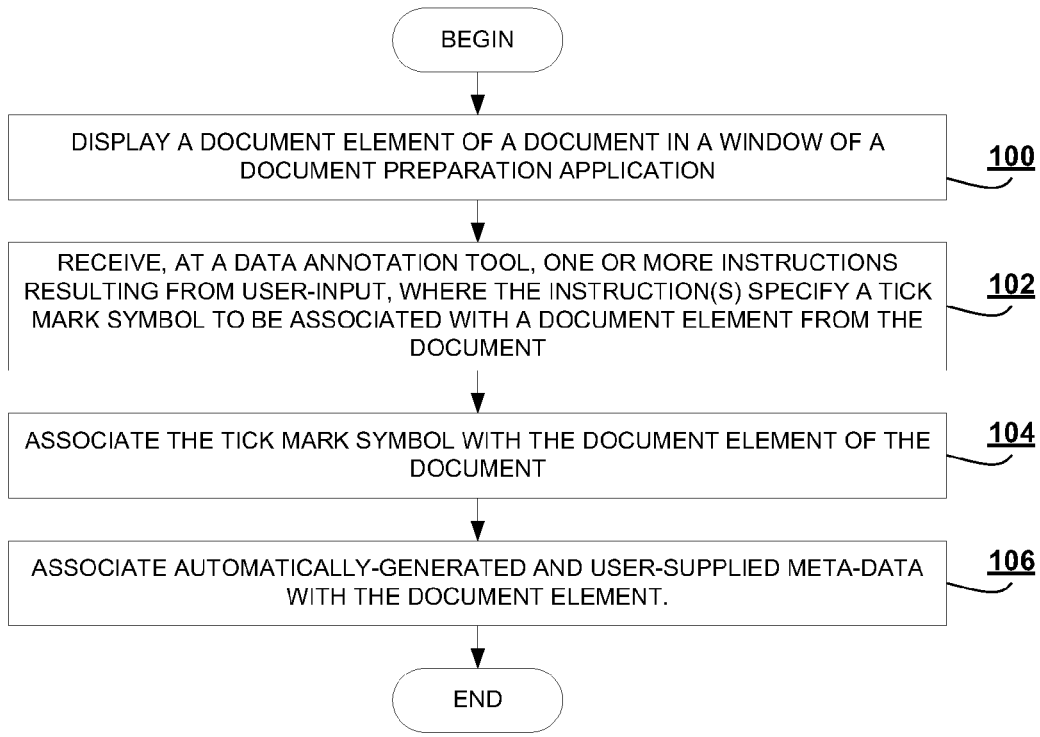
FIG. 6 illustrates a method, according to an embodiment of the invention, for displaying data in a document, where the data has associated with it a tick mark symbol and associated meta-data.

FIG. 6 illustrates a method, according to an embodiment of the invention, for attaching a tick mark symbol and associated meta-data to an element of a document. The method begins at operation method 100 when the document preparation application causes a document to be displayed in the application window. This may include, for example, an application or web server serving the document to a user computer (e.g., client), which receives, renders, and displays the document. Alternatively, in an embodiment implemented as a standalone application, the lone computer may execute the instructions that cause the document to be displayed. In any case, at method operation 102, a data annotation tool receives one or more instructions specifying a tick mark symbol to be associated with a document element from the document displayed in the document preparation application window. The instruction(s) may result, for example, from a user manipulating a pointing device (e.g., mouse) and interacting with a graphical user interface.

At method operation 104, the data annotation tool processes the instructions causing the tick mark symbol to be associated with the document element. This may include, for example, modifying an XML tag to include the tick mark symbol, or alternatively, generating a new XML tag, or other data structure. In addition, a tick mark rule may be associated with the document element and its corresponding tick mark symbol. Finally, at method operation 106, automatically-generated meta-data and/or user-generated metadata may be associated with the document element and its corresponding tick mark symbol. For example, a date and time stamp may be automatically generated and associated with the tick mark symbol. Additionally, a user-generated note may be associated with the tick mark symbol and corresponding document element.

Figure 7:
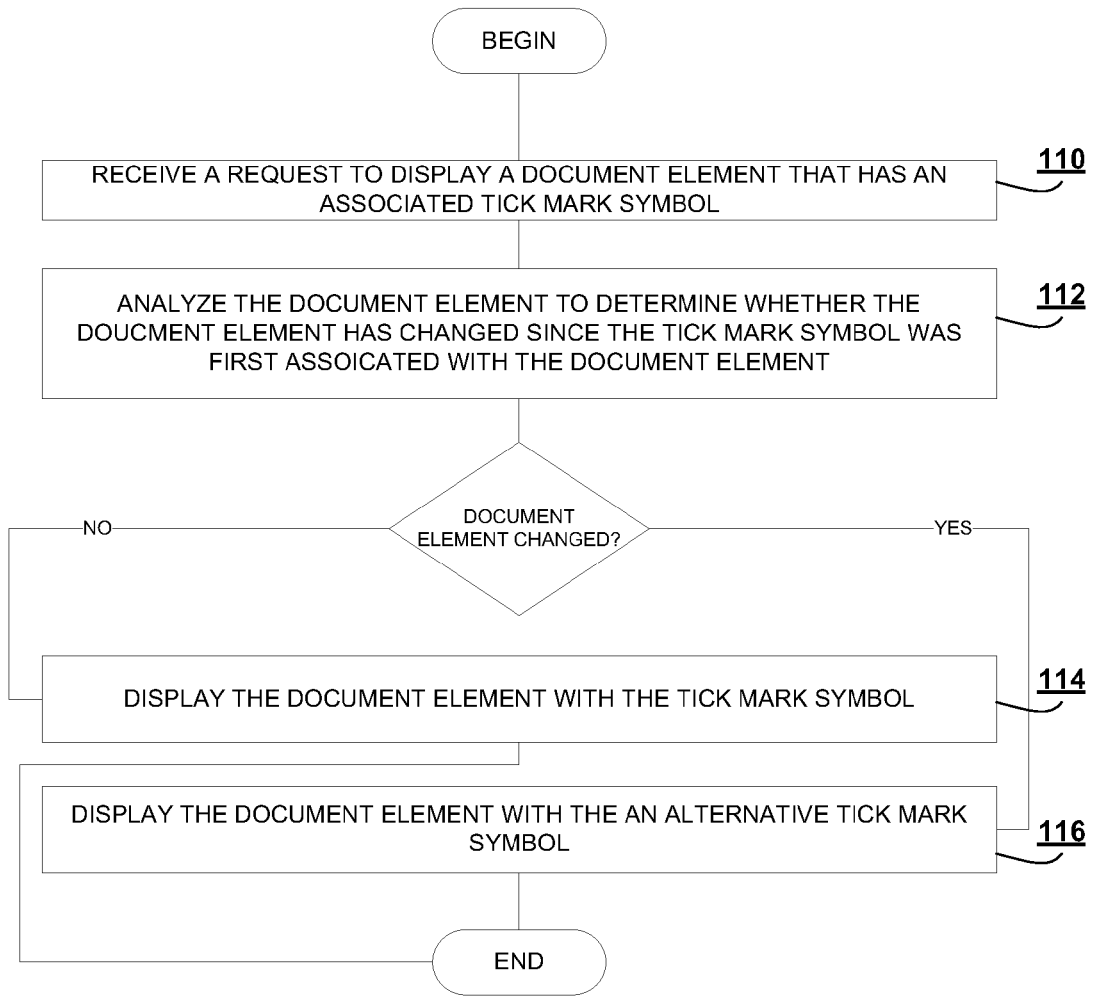
FIG. 7 illustrates a method, according to an embodiment of the invention, for attaching a tick mark symbol and associated meta-data to an element of a document.

FIG. 7 illustrates a method, according to an embodiment of the invention, for displaying data in a document, where the data has associated with it a tick mark symbol and associated meta-data. The method begins at method operation 110, when a request is received to display a document element that has an associated tick mark symbol. The request may be a document request, or alternatively, a query from a query tool. At method operation 112, the document element is analyzed to determine whether the document element has changed since the tick mark was initially associated with the document element. This may be achieved, for example, by processing a tick mark rule.

At method operation 114, if the document element has not changed since the tick mark symbol was associated with the document element, then the document element and the tick mark symbol are presented in accordance with the request. However, at method operation 116, if the document element has changed since the tick mark symbol was originally associated with the document element, then the document element and an alternative tick mark symbol are presented to the requesting user. The alternative tick mark symbol may be specified in a tick mark rule, and generally will convey to the user that the corresponding document element has been modified at some point since the tick mark symbol was initially associated with the document element.

It will be appreciated that in the method presented in FIG. 6, the operations may occur in a different order. For example, the analysis to determine that a document element has changed may occur prior to the request to display the particular document element. In such a case, the request can be processed to display the proper tick mark symbol based on the previous analysis of the document element.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
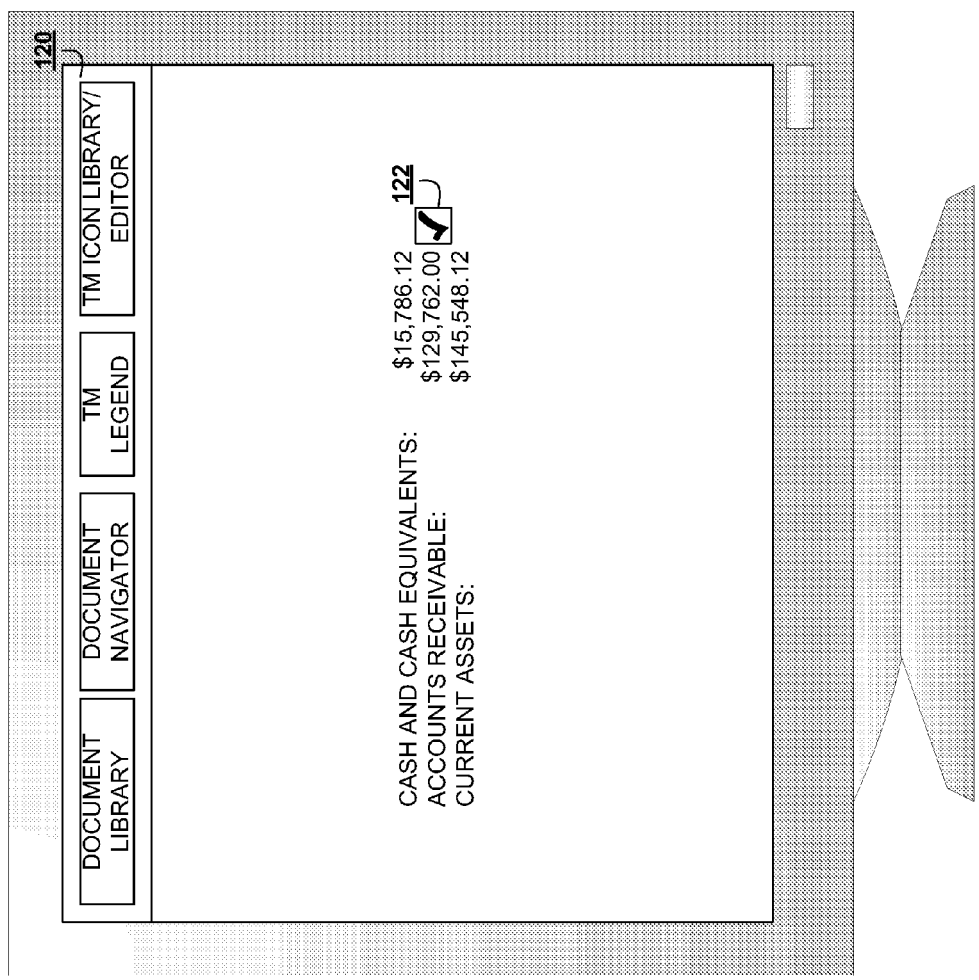
FIGS. 8 and 9 illustrate example user interfaces that may be utilized in an embodiment of the invention.
Figure 9:
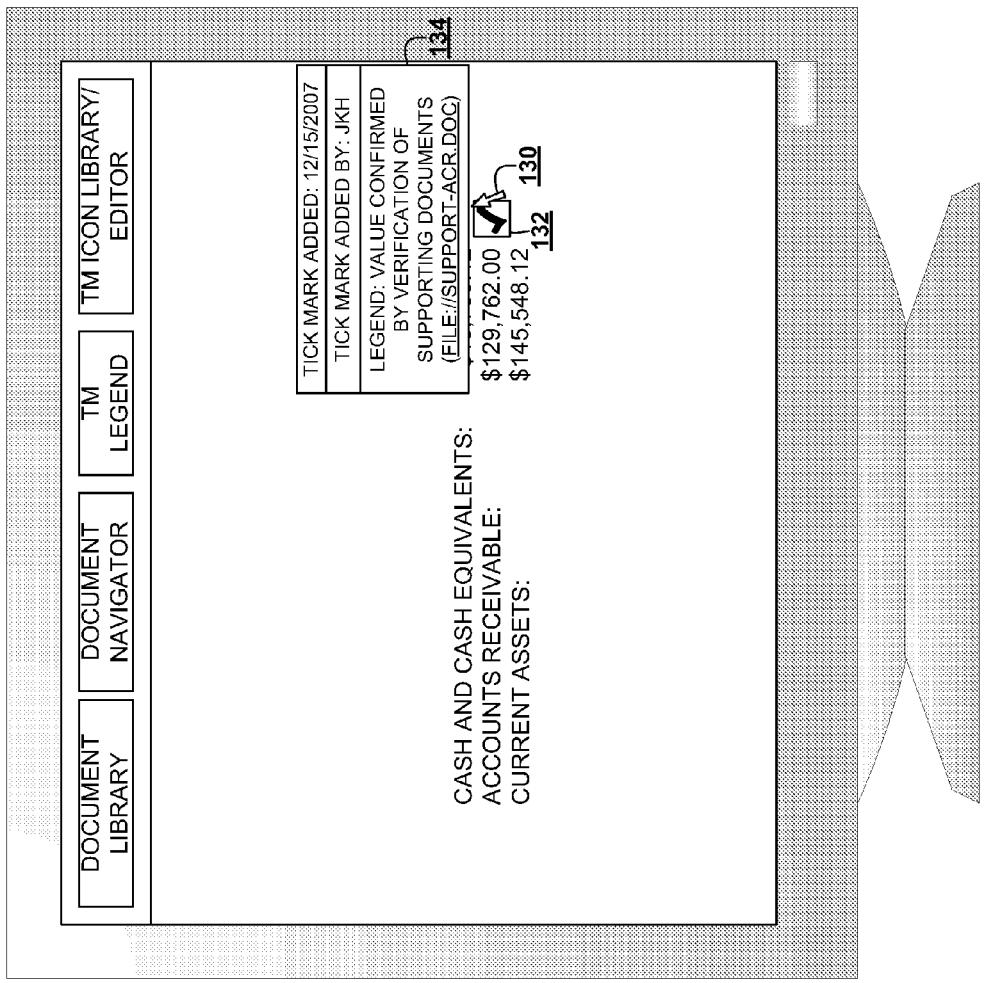

FIGS. 8 and 9 illustrate example graphical user interfaces (GUIs) that may be utilized in an embodiment of the invention. The example GUIs shown in FIGS. 8 and 9 are provided to convey to the reader an understanding of how one particular implementation of a document preparation application with an integrated data annotation tool may look and function. As such, the example user interfaces shown in FIGS. 8 and 9 are not to be construed as limiting the invention. In FIG. 8, a portion of a financial document is displayed in the main window of a document preparation application. In this example, the document preparation application includes a menu or tool bar 120 located in the top portion of the main window. Within the main window, there are three line entries, including an accounts receivable entry with a corresponding value of "$129,762.00". In this example, a tick mark symbol in the form a checkmark 122 is shown next to the number representing the value of the accounts receivable. The checkmark may be placed, for example, by manipulating a cursor pointing device (e.g., a mouse). For example, in one embodiment, clicking a mouse button may cause a checkmark symbol to be positioned in the location of the cursor when the button is clicked or pressed. In other embodiments, a tick mark symbol might be positioned by selecting the tick mark symbol from a group of tick mark symbols, and then dragging the tick mark symbol to the desired location within the document. In one embodiment of the invention, a prompt may be shown to the user, requesting the user to verify that the tick mark symbol (e.g., the checkmark in FIG. 8) is to be associated with a particular value displayed in the document (e.g., the accounts receivable value $129,762.00 in FIG. 8).

FIG. 9 illustrates an example of the meta-data that may be displayed in a pop-up or fly-out window, during what is referred to as a mouse-over event, according to an embodiment of the invention. As illustrated in FIG. 9, a user has manipulated a cursor device (e.g., pointing arrow 130) to position the cursor device on top of or near the checkmark symbol 132. This action is detected by the operating system or the web browser application of the user computer and is referred to as a mouse-over event. This mouse-over event causes the pop-up window 134 to appear. In the pop-up window 134, various meta-data items associated with the checkmark symbol, and the corresponding data item (e.g., the accounts receivable value), are displayed. For example, as shown in the pop-up window of FIG. 9, a date and time stamp indicates the date and time when the checkmark symbol was placed. In addition, the pop-up window shows the initials "JKH" of the user who placed the checkmark symbol. Finally, the pop-up window shows a legend definition, indicating the meaning of the checkmark symbol. In this case, the legend definition includes a hyperlink to a supporting document that may be associated with or include data on which the accounts receivable value is based.

As described and illustrated herein, various embodiments of a data annotation tool provide a mechanism by which a user can quickly and easily annotate a document element with a tick mark symbol, and associated items of meta-data. The tick mark symbol attaches to the value of the document element or item of data, and provides other users viewing the document with information such as, who placed the tick mark symbol, when it was placed, comments or notes from the user who placed the tick mark symbol, and/or a hyperlink to a supporting data source. Users can quickly identify when a data item has changed, when a modified tick mark symbol is displayed next to an item of data. Additionally, the tick mark symbols may be hidden or removed from a version of the document so the document can be viewed, printed or filed without the tick mark symbols and associated meta-data.

Figure 10:
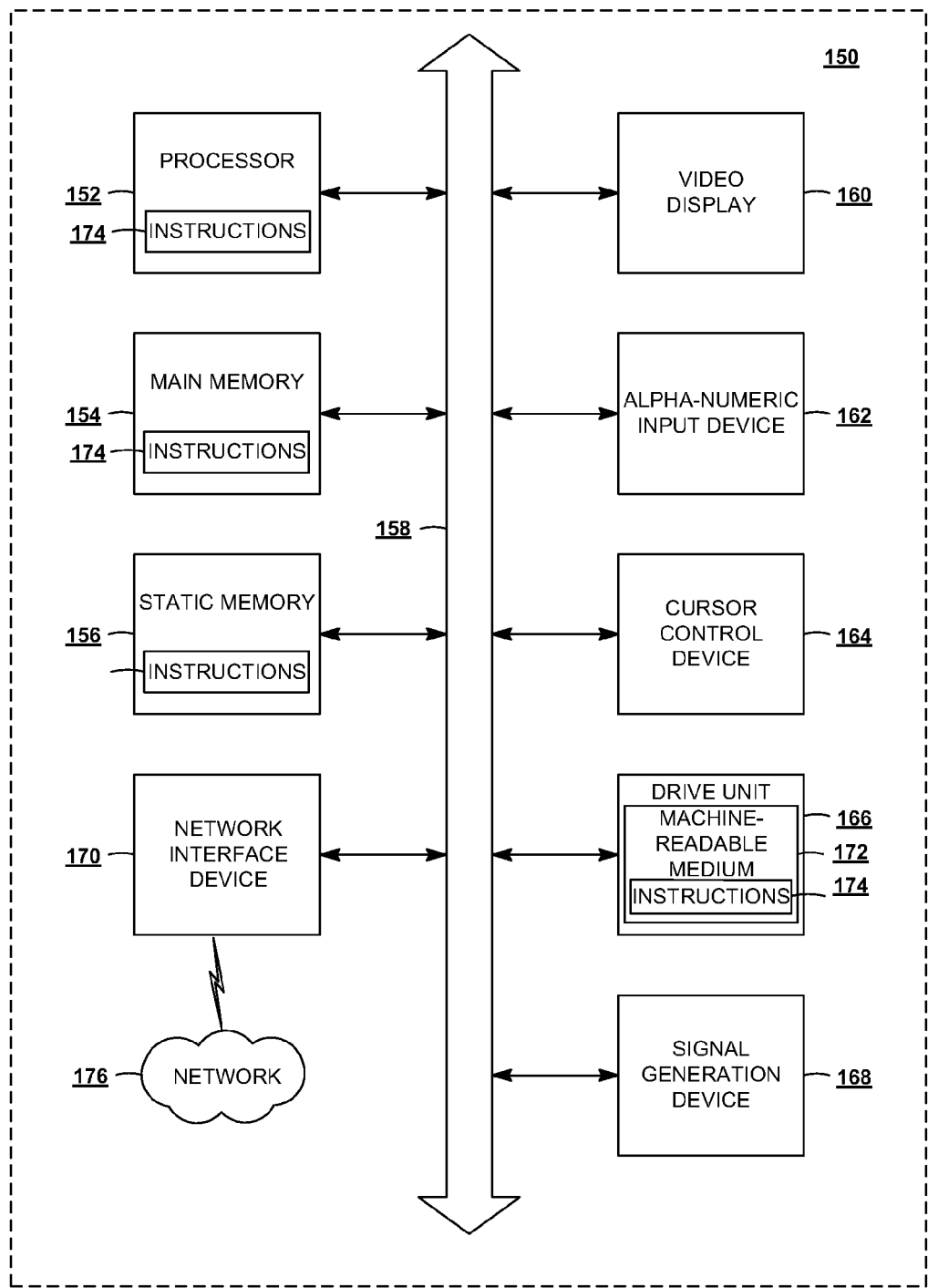
FIG. 10 shows a diagrammatic representation of a machine in the example form of a computer system within which a set of instructions, for causing the machine to perform any one or more of the methodologies discussed herein, may be executed.

FIG. 10 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 150 includes a processor 152 (e.g., a central processing unit (CPU), a graphics processing unit (GPU) or both), a main memory 154 and a static memory 156, which communicate with each other via a bus 158. The computer system 150 may further include a display unit 160, an alphanumeric input device 162 (e.g., a keyboard), and a user interface (UI) navigation device 164 (e.g., a mouse). In some embodiments, the display, input device and cursor control device are a touch screen display. The computer system 150 may additionally include a storage device (e.g., drive unit 166), a signal generation device 168 (e.g., a speaker), a network interface device 170, and one or more sensors (not shown), such as a global positioning system sensor, compass, accelerometer, or other sensor.

The drive unit 166 includes a machine-readable medium 172 on which is stored one or more sets of instructions and data structures (e.g., software 174) embodying or utilized by any one or more of the methodologies or functions described herein. The software 174 may also reside, completely or at least partially, within the main memory 154 and/or within the processor 152 during execution thereof by the computer system 150, the main memory 154 and the processor 152 also constituting machine-readable media.

While the machine-readable medium 172 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 174 may further be transmitted or received over a communications network 176 using a transmission medium via the network interface device 170 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
responsive to receiving a request to display the document element subsequent to attaching the particular tick mark symbol with the document element;
analyzing the document element to determine that a value associated with the document element has changed since the particular tick mark symbol was first associated with the document element; and
displaying the document element with an alternative tick mark symbol different from the particular tick mark symbol.

2. The computer-implemented method of claim 1, wherein the alternative tick mark symbol, when displayed in a document in visual association with the document element, provides a visual indicator that the value associated with the document element was previously verified, but has since been altered.

3. The computer-implemented method of claim 1, wherein:
the request to display the document element is a request to display the document element in a second document different from the first document; and
displaying the document element with an alternative tick mark symbol different from the particular tick mark symbol includes displaying the document element in the second document.

4. The computer-implemented method of claim 1, further comprising:
in addition to displaying the document element with the alternative tick mark symbol, displaying any one or more of:
a user identifier indicating the name of a person who caused the instructions to be received as a result of user-input;
a date and time stamp indicating at least one of the day and time when the particular tick mark symbol was associated with the document element;
a textual comment provided by a user; and
the link.

5. The computer-implemented method of claim 1, wherein the meta-data is user-supplied meta-data.

6. The computer implemented method of claim 1, wherein the data annotation tool is a wiki-based system, the method further comprising:
tracking changes to the document element by changing source and time.

7. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
responsive to receiving a request to display the document element subsequent to attaching the particular tick mark symbol with the document element;
analyzing the document element to determine that a value associated with the document element has changed since the particular tick mark symbol was first associated with the document element; and
displaying the document element with the particular tick mark symbol with modified formatting that is different from the formatting of the particular tick mark symbol when the particular tick mark symbol was first associated with the document element.

8. The computer-implemented method of claim 7, wherein displaying the document element with the particular tick mark symbol with modified formatting includes displaying the particular tick mark symbol in a different color, size or font from the color, size or font used when initially displaying the particular tick mark symbol.

9. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
responsive to receiving a request to display the document element subsequent to attaching the particular tick mark symbol with the document element;
analyzing the document element to determine that a value associated with the document element has not changed since the particular tick mark symbol was first associated with the document element; and
displaying the document element with the particular tick mark symbol.

10. The computer-implemented method of claim 9, wherein:
the request to display the document element is a request to display the document element in a second document different from the first document; and
displaying the document element with the particular tick mark symbol includes displaying the document element in the second document.

11. The computer-implemented method of claim 10, further comprising:
in addition to displaying the document element with the particular tick mark symbol, displaying any one or more of:
a user identifier indicating the name of a person who caused the instructions to be received as a result of user-input;
a date and time stamp indicating at least one of the day and time when the tick mark symbol was associated with the document element;

a textual comment provided by a user; and
the link.

12. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document; and
associating automatically generated meta-data with the particular tick mark symbol;
wherein the automatically generated meta-data includes a link to a supporting document or related item of data and any one or more of:
a user identifier indicating the name of a person who caused the instructions to be received as a result of user-input; and
a date and time stamp indicating at least one of the day and time when the tick mark symbol was associated with the document element.

13. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document; and
associating meta-data with the particular tick mark symbol, wherein the meta-data includes a link to a supporting document or related item of data;
wherein an attribute of the particular tick mark symbol is changeable without direct user input to the particular tick mark symbol.

14. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document; and
associating meta-data with the particular tick mark symbol, wherein the meta-data includes a link to a supporting document or related item of data;
wherein the attaching is done such that changes to the document element automatically cause an attribute of the particular tick mark symbol to change.

15. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document; and
associating meta-data with the particular tick mark symbol, wherein the meta-data includes a link to a supporting document or related item of data;
wherein the attaching further comprises attaching to the particular tick mark symbol a tick mark rule defining a change in an attribute of the particular tick mark symbol when an attribute of its attached document element changes.

16. The computer implemented method of claim 15, wherein the attached tick mark rule is a default tick mark rule.

17. The computer implemented method of claim 15, further comprising:
providing a tick mark rule editor as a part of the data annotation tool; and
editing the tick mark rule with the editor as a condition and action pair.

18. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
selecting a first tick mark display mode;
displaying a first set of tick marks associated with the document element when the first tick mark display mode is selected;
selecting a second tick mark display mode; and
displaying a second set of tick marks associated with the document element that differs from the first set of tick marks when the second tick mark display mode is selected.

19. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
defining user authentication information associated with the document element; and
restricting user access to the particular tick mark symbol based on the user authentication information.

20. A computer-implemented method comprising:
displaying a document element in a first document of a document preparation application;
receiving, at a data annotation tool, one or more instructions resulting from user-input, an instruction specifying that a particular tick mark symbol is to be associated with a document element within the first document;
attaching the particular tick mark symbol with the document element displayed within the first document;
associating meta-data with the particular tick mark symbol, wherein the meta-data includes a link to a supporting document or related item of data;
utilizing a query processing tool to request a specific document element;
returning query results containing only the requested specific document element; and
including with the returned query results associated tick mark symbols.

21. The computer implemented method of claim 20, wherein the request of the specific document element is a request for document elements tagged with a specific tick mark symbol.

* * * * *